United States Patent [19]

Dreyer

[11] Patent Number: 5,745,632
[45] Date of Patent: Apr. 28, 1998

[54] TOTALLY INTERNALLY REFLECTING LIGHT CONDUIT

[75] Inventor: John F. Dreyer, Ramsey, Minn.

[73] Assignee: Minnesota Mining and Manufacturing Co., St. Paul, Minn.

[21] Appl. No.: 824,027

[22] Filed: Mar. 25, 1997

Related U.S. Application Data

[63] Continuation of Ser. No. 544,775, Oct. 18, 1995, abandoned.

[51] Int. Cl.$^6$ ........................................ G02B 6/00
[52] U.S. Cl. ...................... 385/133; 385/147; 385/901; 359/831; 359/833; 362/32
[58] Field of Search ........................ 385/133, 146, 385/147, 901; 359/831, 833, 850, 515; 362/32, 346

[56] References Cited

U.S. PATENT DOCUMENTS

| | | | |
|---|---|---|---|
| 3,689,346 | 9/1972 | Rowland | 156/245 |
| 4,244,683 | 1/1981 | Rowland | 425/143 |
| 4,260,220 | 4/1981 | Whitehead | 350/96.28 |
| 4,576,850 | 3/1986 | Martens | 428/156 |
| 4,805,984 | 2/1989 | Cobb, Jr. | 350/96.28 |
| 4,906,070 | 3/1990 | Cobb, Jr. | 350/286 |
| 4,989,948 | 2/1991 | Dreyer, Jr. | 350/97 |
| 5,056,892 | 10/1991 | Cobb, Jr. | 359/831 |
| 5,309,544 | 5/1994 | Saxe | 385/901 X |
| 5,363,470 | 11/1994 | Wortman | 385/901 X |

FOREIGN PATENT DOCUMENTS 2 127 344  4/1984  United Kingdom.

OTHER PUBLICATIONS

3M Brochure entitled "Market Test, 3M Lighted Guidance Tube (LGT), System Pricing," No. 75–0299–9282–5(62.35)R1 IL, dated Apr. 15, 1992.

3M Brochure entitled "Lighted Guidance Tube," No. 75–0300–1245–6 (94.75)ii, 1994. no month.

3M Product Bulletin entitled "Lighted Guidance Tube," No. 75–0300–1218–3, dated Jul. 1994.

*Primary Examiner*—Phan T. H. Palmer
*Attorney, Agent, or Firm*—Stephen W. Buckingham

[57] ABSTRACT

A hollow, cylindrical light conduit for transporting light generally longitudinally therethrough and distributing light therealong includes a cylindrical wall member of a transparent material. The wall member has an inner cylindrical smooth surface and an outer cylindrical structured surface having an array of isosceles prisms arranged side by side thereon. The faces of adjacent prisms extend longitudinally along the cylindrical wall member and are aligned at the same desired prism angle relative to one another. The light transporting performance of the light conduit, achieved by total internal reflection, and the light distributing performance of the light conduit, specifically relative to radially aligned, high incident angle longitudinal light rays in planes parallel or near parallel to the prisms, is optimized as a function of the desired prism angle between the faces of adjacent prisms.

8 Claims, 4 Drawing Sheets

TOTALLY INTERNALLY REFLECTING LIGHT CONDUIT

This is a continuation of application Ser. No. 08/544,775 filed Oct. 18, 1995 now abandonment.

BACKGROUND OF THE INVENTION

The present invention relates to a light conduit for transporting and/or distributing light, and specifically to a hollow, cylindrical light conduit formed from a transparent material having a smooth inner surface and an outer structured surface defined by a plurality of side-by-side longitudinally disposed prisms.

It is known to form hollow light conduit structures from tubular transparent material having a smooth side and an opposite structured side. In such structures, the structured side has been defined by a plurality of substantially right-angled isosceles prisms arranged side by side so that the perpendicular sides of each prism make an angle of approximately 45 degrees with the tangent to the adjacent smooth surface opposite the structured surface (i.e., faces of adjacent prisms intersect at right angles). Light entering the light conduit within an acceptable angular range is contained by total internal reflection as it travels along the length of the light conduit. This structure is disclosed in U.S. Pat No. 4,805,984, and films for defining such tubular light conduits are disclosed in U.S. Pat. Nos. 4,906,070 and 5,056,892, all of which are incorporated by reference herein. Commercially, this light conduit structure is embodied in the "3M Lighted Guidance Tube System," available from Minnesota Mining and Manufacturing Company, St. Paul, Minn.

As mentioned, the prisms of the aforementioned prior art light conduit prisms are substantially right-angled isosceles prisms. While this arrangement provided a suitable light conduit, it was limited in performance by the right-angled prism configuration. It is desired to provide freedom of angles of the linear prism array, and thus provide light conduits having different characteristics (e.g., light transmission and/or light distribution) than the prior art.

SUMMARY OF THE INVENTION

The present invention provides a novel, totally internally reflecting light conduit for light piping (transporting light generally longitudinally therethrough) and distributing light therealong. The light conduit includes a cylindrical wall member of a transparent material, having a structured surface on an outer cylindrical side, and a smooth surface opposite the structured surface on an inner cylindrical side. The structured surface has an array of prisms arranged side by side thereon, with faces of adjacent prisms extending longitudinally along the cylindrical wall member and aligned at a same desired prism angle. The light transporting performance of the light conduit, by total internal reflection, and the light distributing performance of the light conduit, relative to radially aligned, high incident angle longitudinal light rays in planes parallel or near parallel to the prisms, is optimized as a function of the desired prism angle between the faces of adjacent prisms.

In this regard, the light transporting performance of the light conduit is enhanced, and the light distributing performance of the light conduit is diminished, relative to such radially aligned, high incident angle longitudinal light rays in planes parallel or near parallel to the prisms, by forming the prisms as isosceles prisms and selecting a desired prism angle ($\beta$) which optimizes the total internal reflection characteristic of the light conduit. In some desired prism ranges

2

(where 90°<$\beta$<120° and where 120°<$\beta$<180°), the thickness of the cylindrical wall member is a factor. In other instances (where 0°<$\beta$<90° and where $\beta$=120°), the thickness of the cylindrical wall is not a factor.

BRIEF DESCRIPTION OF THE DRAWINGS

The present invention will be more fully described with reference to the accompanying drawings wherein like reference numerals identify corresponding components.

While the above-identified drawing features set forth preferred embodiments, other embodiments of the present invention are also contemplated, as noted in the discussion. The disclosure presents illustrative embodiments of the present invention by way of representation and not limitation. Numerous other modifications and embodiments can be devised by those skilled in the art which fall within the scope and spirit of the principles of this invention. The drawing figures have not been drawn to scale as it has been necessary to enlarge or emphasize certain features for clarity of representation.

DETAILED DESCRIPTION OF THE PREFERRED EMBODIMENTS

Figure 1:
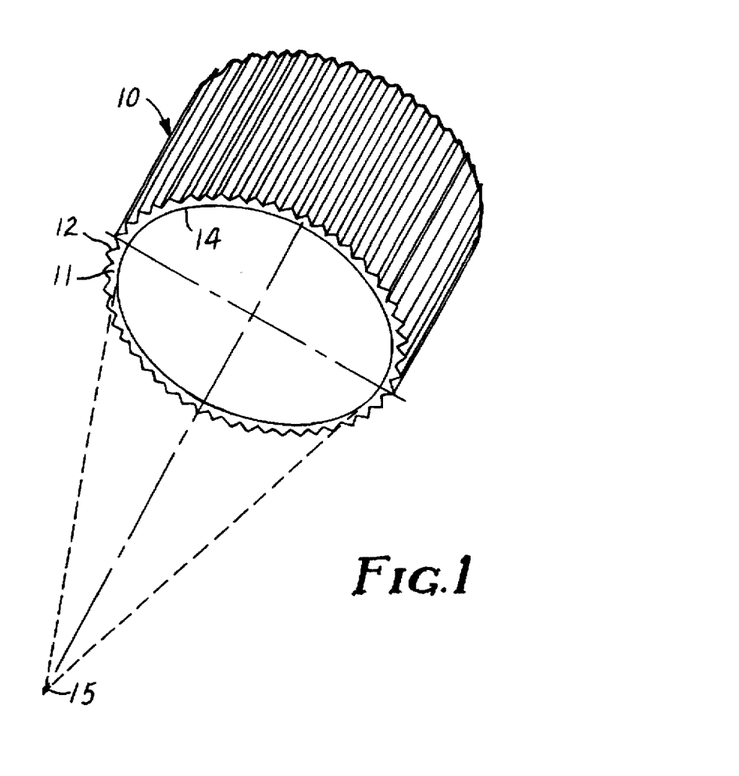
FIG. 1 is a perspective view of a light conduit of the present invention.

Referring to FIG. 1 of the drawings, a hollow, tubular light conduit of the present invention, generally designated 10, may be used to transport and/or distribute a predetermined portion of light therealong. The light conduit includes a wall 11, of a transparent material, having a structured surface 12 on one side and a smooth surface 14 opposite the structured surface on the other side. Incident light from a light source will be transmitted (refracted) or reflected upon striking smooth surface 14 (see light rays 15a, 15b and 15c in FIG. 2). Incident light from the light source 15 that is transmitted through the wall 11 to strike the surface 12, within an acceptable angular range, will be totally internally reflected, as illustrated by light ray 15a in FIG. 2. The light will be totally internally reflected when the light refracted by the first surface (surface 14) strikes the second surface (surface 12) at an angle, with respect to the normal, greater than the critical angle. Likewise, light reflected from the surface 12 which strikes the surface 14 at an angle, relative to the normal, greater than the critical angle will be totally internally reflected. This critical angle is defined as the arc sine of the ratio of the index of refraction of the surrounding medium (typically air) to that of the wall material. As the light passes through the wall 11, there is negligible absorption of light by the wall material.

Figure 2:
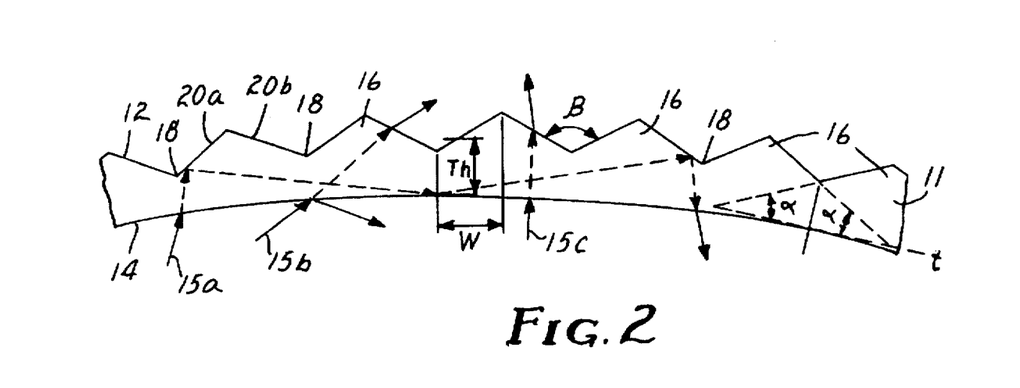
FIG. 2 is a fragmentary end view of the light conduit of FIG. 1.

In a preferred embodiment, the structured surface 12 includes a linear array of isosceles prisms 16 arranged side by side in parallel relationship to form a plurality of grooves 18 running the length of the light conduit 10, as illustrated in FIG. 2. The faces 20a and 20b of prism 16 are nominally flat and all make the same angle alpha ($\alpha$) with the tangent (t) to the adjacent smooth surface 14. The faces 20a and 20b of each prism also make the same angle ($\beta$) relative to each other. The angular orientation of adjacent prism faces is determinative of the relative light transmission and distribution by the light conduit 10, as discussed below.

The particular material used for the wall 11 of the light conduit 10 may vary, but it is intended that in most applications that the material be normally flexible, and yet may not have sufficient strength to be self-supporting in particular applications. The flexibility of the wall can best be defined as the ability to be curled so that the smooth surface 14 is a smooth continuous arcuate curve having no discernible discontinuities, such as kinks, fractures, segments, or the like. It is, however, essential that the material be transparent, and preferably homogeneous and isotropic. Useful polymeric materials for this purpose are commercially available grades of, for example, acrylics and polycarbonates having nominal indices of refraction of 1.493 and 1.586, respectively. Other useful polymers are polyurethane, polystyrene, polyvinyl chloride and the like. The particular polymeric material selected is not significant to the invention hereof, so long as it provides the described function. Acrylics and polycarbonates are of particular interest because of their high indices of refraction and physical properties, i.e., weatherability, ultraviolet resistance, dimensional stability, and temperature tolerance, to name a few. By way of illustration, the critical angle (relative to air as the surrounding medium) is 39 degrees for a suitable polycarbonate and 42 degrees for a suitable acrylic, as compared to 44 degrees for glass.

There are several ways to mass produce the wall 11 of the light conduit 10 of the present invention which are well known to those skilled in the art, for example as illustrated in U.S. Pat. Nos. 3,689,346, 4,244,683, 4,576,850 and U.K. patent application No. GB 2,127,344 A, the disclosures of which are hereby incorporated by reference. In addition, previous methods for mass producing rigid sheets have also included compression molding, casting or calendaring. The particular manufacturing process is not essential to the present invention, and is a matter of choice based upon economics and availability. However, it is preferred that a thin, flexible film be utilized to form the light conduit. Such a film, which would define the wall 11, may be curled into a tubular configuration and the seam fastened by welding, or for particular applications, it may be acceptable to simply overlap, join or abut the edges. In addition, it should be appreciated that the light conduit 10 may be extruded or molded to provide a flexible or rigid unitary member. The description of the present light conduit 10 and its use will proceed on the basis of its being formed by curling a thin, flexible film.

As mentioned above, it is desired that the wall 11 be sufficiently flexible to be curled so that it may be formed into a variety of shapes, such as tubular or cylindrical. An approximation for the minimum cylindrical diameter D to which a particular film having a thickness $T_1$, as measured from the smooth surface 14 to the valley of the grooves 18, may be curled is determined by the equation: $D = T_1 \times C$, where C is a constant associated with the modulus of elasticity of the particular material. When the prisms 16 are micro in size, at least 40 per inch, and the film 10 has a particular thickness $T_1$, it may be curled such that the smooth surface 14 will lie in a smooth continuous arcuate curve while maintaining total internal reflection. It has been determined that an acrylic film having prisms micro in size has a constant C of about 200 associated therewith. For example, a 0.015 inch thick acrylic film having about 70 prisms per inch will exhibit sufficient flexibility to be capable of being easily curled into a cylinder having a minimum diameter of approximately 3 inches, while maintaining a smooth continuous arcuate surface without breaking. In addition, such a film will be rigid and self-supporting enough to easily maintain its shape when curled into a cylinder having a diameter of approximately 18 inches. This ability to maintain reflectivity results in the film being able to be utilized in a variety of ways, and eliminates the prior requirement that the optically active surface be rigidly maintained in a planar configuration, as taught by U.S. Pat. No. 4,260,220.

It has been found that certain cross-sectional shapes, especially circular and elliptical, provide enhanced optical performance by increasing the acceptable angular range of transportable light rays. Specifically, as illustrated in FIG. 1, a circular cross-sectional light conduit 10, with the prisms 16 on the outer, convex side, has been found to provide optimum performance. However, it should be appreciated that a variety of cross-sectional shapes may be utilized depending upon the requirements of the application, and that the structured surface 12 may be on the inner side, as long as at least a portion of the wall 11 defines an arcuate curve.

Heretofore, it was believed necessary that a tubular light conduit have substantially right-angled isosceles prisms, with each of the faces of the prisms aligned at an angle ($\propto$) of 45 degrees with the tangent of the opposite smooth surface (an faces of adjacent prisms intersecting at right angles). It has now been discovered, however, that suitable total internal reflection in a cylindrical light conduit is attainable without a 90 degrees angle between contiguous faces of adjacent prisms. By varying the prism angles, the light transmissive and distributive characteristics of the light conduit can be manipulated and optimized as desired to fit particular applications. The light transmissive and distributive characteristics of the light conduit are optimized as a function of the angle between faces of adjacent parallel prisms, with respect to radially aligned, high incident angle longitudinal light rays in planes parallel or near parallel to the prisms. The relationships for achieving light piping characteristics of the light conduit (through one or more total internal reflections of a light ray) vary, depending upon the desired prism angle (the angle ($\beta$) between adjacent prism faces). Piping of radially aligned, high incident angle longitudinal light rays in planes parallel or near parallel to the prisms, via one or more total internal reflection events, is achieved when the following conditions are met (when the prisms are isosceles prisms):

(1) when $0° < \beta < 90°$, $N\beta = 90$;
(2) when $90° < \beta < 120°$, $Th = (N_0 + \frac{1}{2})W \times \tan(270 - 2\beta)$;
(3) when $\beta = 120°$; and
(4) when $120° < \beta < 180°$, $$Th = \frac{(N_0 + 1/2)W}{-\tan\beta},$$

where
$\beta$ = the desired prism angle

N=any positive integer
Th=the average thickness of the wall member
N₀=zero or any positive integer
W=one half the width of each prism.

The variables $\beta$, Th and W are identified in FIG. 2.

For desired prism angles represented by conditions 1 and 3 above, the thickness of the wall member and prism width are of no consequence. However, for conditions 2 and 4 listed above, the thickness of the wall member and prism width are factors in achieving light piping by total internal reflection. Depending upon the selected desired prism angle ($\beta$), the light conduit can be 100 percent totally internally reflective, 100 percent transmissive, or partially reflective or transmissive (except for fresnel reflections). For example, when $0°<\beta<90°$, the light conduit is completely transmissive if $N\beta+\beta/2=90$. Likewise, the light conduit is totally transmissive if $\beta=180°$ (again, except for fresnel reflections). Thus, it is now appreciated that modifying the desired prism angle results in a optimization of the totally internally reflective and transmissive characteristics of the light conduit, dependent upon the functions set forth above. One preferred embodiment is illustrated in FIG. 2, where adjacent faces of prisms are aligned at 120° and wherein each of the faces of the prisms are aligned at an angle ($\infty$) of 30° with the tangent (t) of the smooth surface 14.

In this regard, with side by side prisms having adjacent faces meeting at angles greater than 90 degrees (e.g., 120 degrees, as illustrated in FIG. 2), the ability to repeatedly and reliably form more precise prism structures is also enhanced. With a relaxed angle across groove 18 (e.g., 120 degrees instead of 90 degrees), the structured surface becomes easier to form by such methods as molding, since it takes less pressure to fill the mold and it is easier to release the formed structured surface from the mold.

Figure 3A:
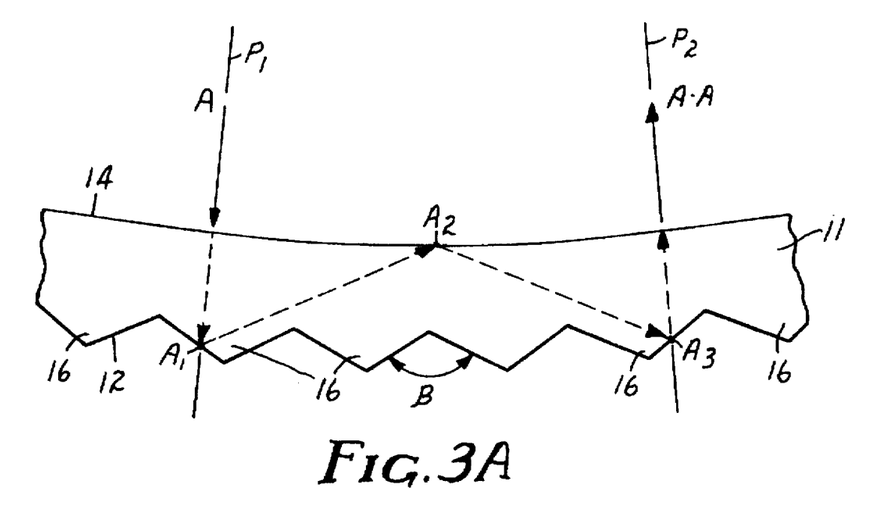
FIG. 3A is a fragmentary end view of the light conduit of FIG. 1.
Figure 3B:
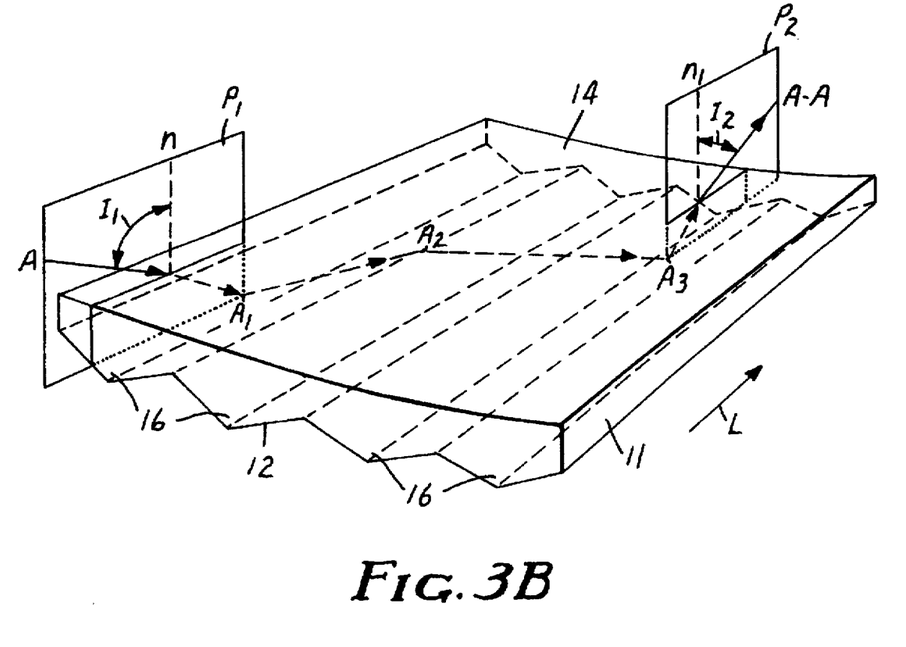
FIG. 3B is a fragmentary perspective view of the light conduit of FIG. 1.
Figure 4:
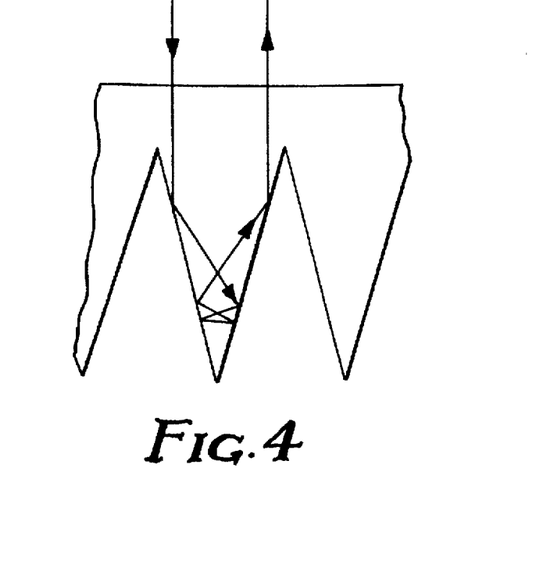
FIG. 4 is a fragmentary end view of an alternative wall structure for a light conduit of the present invention.
Figure 5:
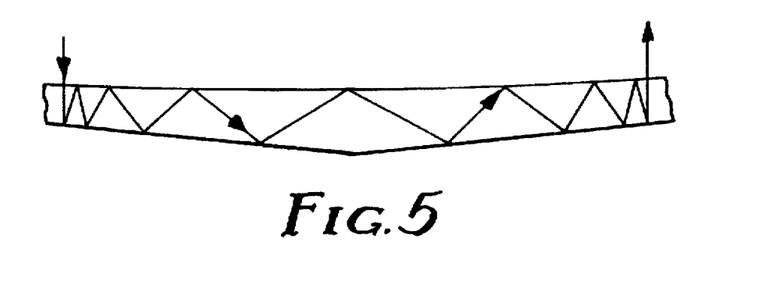
FIG. 5 is a fragmentary end view of a further alternative wall structure for a light conduit of the present invention.
Figure 6:
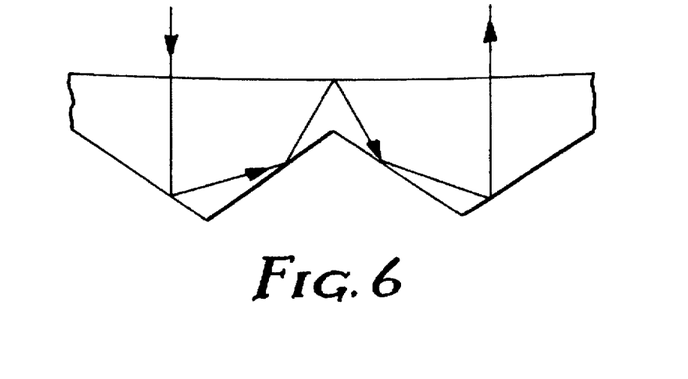
FIG. 6 is a fragmentary end view of a further alternative wall structure for a light conduit of the present invention.

FIGS. 3A and 3B are intended to illustrate a light conduit having a cylindrical wall, with an inner smooth surface and an outer structured surface. The prisms on the structured surface are 30 degree isosceles prisms with their adjacent prism faces aligned at 120 degrees (angle $\beta$). Radially aligned light ray A is intended to illustrate an incident light ray parallel or near parallel to the prisms of the light conduit, which is piped by total internal reflection. As shown, a light ray A extends from along a radius from the center of the light conduit and generally longitudinally along the direction L in which the linear array of prisms 16 of the structured surface 12 lie. As seen in FIG. 3B, light ray A is incident on the smooth surface 14, at an angle $I_1$ made with the normal n to the smooth surface 14 (light ray A and normal n lie in plane $P_1$), and is refracted to point $A_1$, and then totally internally reflected between the structured surface 12 and smooth surface 14 at points $A_1$, $A_2$ and $A_3$. Light ray A ultimately emerges from the smooth surface 14 as reflected light ray A—A, at an angle $I_2$ made with the normal n to the smooth surface 14 (light ray A—A and normal n lie in plane $P_2$).

In a light conduit application where an axially aligned illumination source is provided at one end of the light conduit, light rays extending perpendicular to the prisms will be much less common than light rays such as A (having some considerable vector component that is parallel to the prisms). There will also be some light rays which are not radially aligned (e.g., chords). At a desired prism angle of 120 degrees, radially aligned, high incident angle longitudinal light rays (rays traveling in planes parallel to or nearly parallel to the prisms) will see changed angles of incidence as they travel through the light conduit wall 11. Some of these light rays will then be more likely to exceed the critical angle and experience total internal reflection. See, e.g., the angles of incidence at $A_1$, $A_2$ and $A_3$, which are larger because of the three-dimensional aspect of the optical structure.

Figure 7:
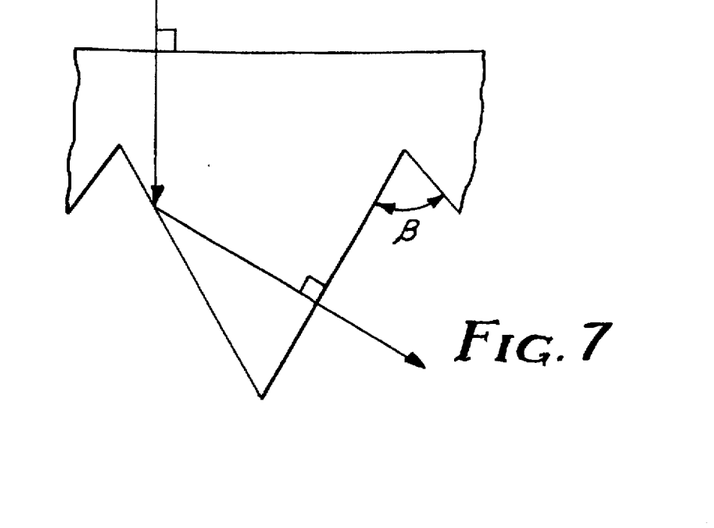
FIG. 7 is a fragmentary end view of a further alternative wall structure for a light conduit of the present invention.

FIGS. 1-3 illustrate light conduit wall structures, for example, with 120 degree prism interfaces (and prism angles to the opposite smooth surface tangent of 30 degrees). When considering rays of high input angle, as illustrated in FIG. 3B, other relative prism angles on the structured surface of the wall will also work to attain light piping via total internal reflection as desired and refractive transmission as desired. The prism faces must not be parallel to the opposite smooth surface, and high incident angle longitudinal rays (rays traveling in planes parallel or near parallel to the prisms) will then see increased angles of incident on the far side of the wall. These light rays will then be more likely to exceed the relevant critical angle and experience total internal reflection. FIGS. 4, 5, 6, 8 and 9 show other prism angles that will suffice for this purpose to transmit and distribute light in a tubular light conduit. FIGS. 4, 5, 6, 8 and 9 are merely exemplary, and other prism angles will also suffice, understanding that the light transporting performance by total internal reflection and the light distributing performance by transmission of the light conduit is a function of the prism angle ($\beta$) selected, pursuant to the specific relationships detailed above. Conversely, FIG. 7 illustrates a tubular light conduit designed to be completely transmissive (where $\beta=60°$ and $N_0=1$, thus satisfying the function $N_0\beta+\beta/2=90$, when $0°<\beta<90°$) (except for fresnel reflections).

Application and Use

Several of the various applications and uses of the light conduit 10 of the present invention will now be described. The most promising and revolutionary use of the tubular light conduit 10 is a formation whereby the smooth surface 14 lies in a smooth continuous arcuate curve, as illustrated by the cylindrical light conduit in FIG. 1. Thus, light can be directed into the light conduit 10, as illustrated in FIG. 1, by a light source 15, and a predetermined portion of the light, dependent upon the size and placement of the light source, will be contained by total internal reflection and will emerge from the other end when the prisms 16 are disposed parallel to the axis of the light conduit 10.

As noted above, a light ray incident upon the surfaces of the light conduit 10 at or below the critical angle will not be totally internally reflected. Rather, it will be refracted as it passes through and out of the light conduit. Thus, the light conduit will act as an illuminator by permitting certain light leakage. One particularly useful application for the light conduit in this regard is an elongated low-level illuminator for roadway barriers, curves and the like. A cylindrical light conduit such as light conduit 10 is aligned within a protective outer cylindrical polymer tube, which in turn is mounted at points along its length to a highway barrier or suitable support. The outer tube supports the light conduit, protects its prisms from physical damage and optical interference (e.g., debris), and may also protect the light conduit material from the environment by other means, such as by ultraviolet screening additives in the outer tube material. A suitable light source is provided at one (or both) ends of each length of the light conduit. Sections of light conduit are abutted and joined by light source housings or other suitable connectors, to form a highway illuminator extending as long as desired along a roadway.

The performance of the light conduit 10 may be manipulated so that it may be used to transport and distribute light by, either singularly or in combination, adding diffusing or reflecting particles, or by incorporating imperfections, such as non-optically smooth prism surfaces and/or non-optically sharp corners, or structuring the smooth surface 14.

Figure 8:
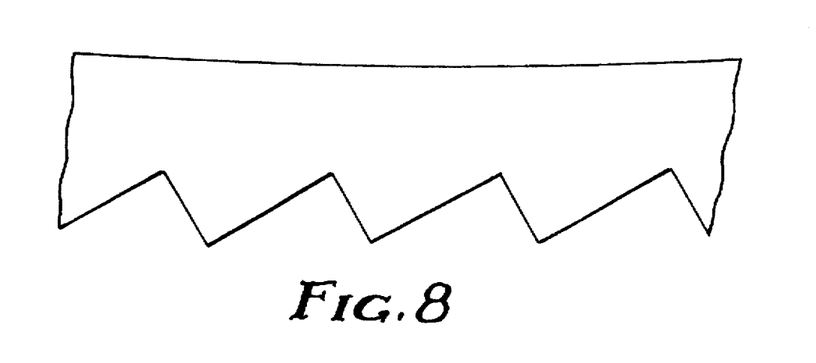
FIG. 8 is a fragmentary end view of a further alternative wall structure for a light conduit of the present invention.
Figure 9:
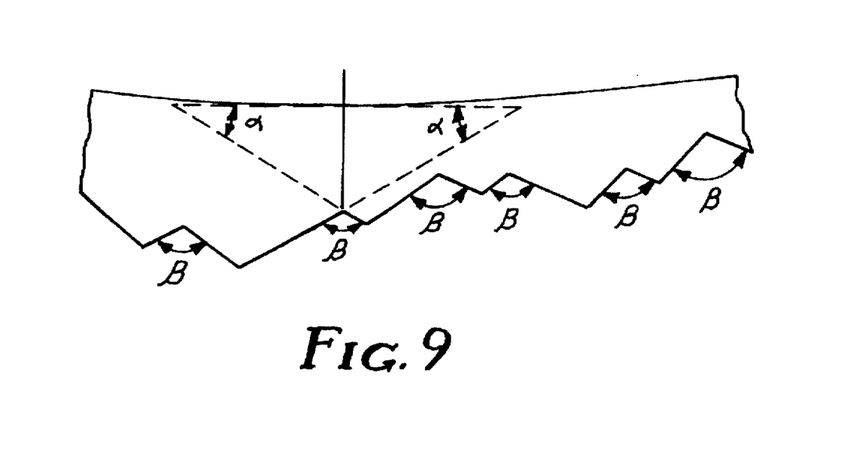
FIG. 9 is a fragmentary end view of a further alternative wall structure for a light conduit of the present invention.

While a preferred embodiment of the present invention and several alternative embodiments have been described so as to enable one skilled in the art to practice the techniques of the present invention, the preceding description is intended to be exemplary and should not be used to limit the scope of the invention. The scope of the invention should be determined only by reference to the following claims. For instance, while the above discussion has noted that the side-by-side prisms are preferably isosceles prisms, an array of non-isosceles prisms will also suffice in achieving the ends of the invention (see, e.g., FIGS. 8 and 9). In FIG. 8, the prisms are still shown as a uniform longitudinally extending prism array, but the two faces of each prism in the array have differing lengths. In FIG. 9 for instance, the prism angles ($\beta$) are all 120 degrees and each prism face intersects a tangent to the opposite smooth side at an angle ($\alpha$) of 30 degrees, but the faces sides of the prisms have differing lengths in a non uniform manner. In addition, while it is preferred that the prisms are aligned parallel to a longitudinal axis of the light conduit, prisms aligned at a slight spiral orientation about that axis will also work to achieve the essence of the present invention. In that instance where the light conduit is formed by curling and abutting ends of a sheet of wall material, placing a slight spiral orientation to the sheet increases the structural integrity of the light conduit, by forming a spiral seam between longitudinal abutting edges of the sheet instead of a linear seam.

What is claimed is:

1. A hollow tubular light conduit for distributing light therefrom comprising:

a cylindrical wall member of a transparent material, the wall member having an inner smooth surface and an outer structured surface, the structured surface having a linear array of isosceles prisms arranged side by side thereon with faces of adjacent prisms extending longitudinally along the cylindrical wall member and aligned at a selected prism angle of greater than 0 and less than 90 degrees wherein, depending on the selected prism angle, the wall member exhibits light distribution relative to radially aligned, high incident angle longitudinal light rays in planes parallel or near parallel to the prisms when the following condition is satisfied:

$N_0\beta+\beta/2=90$ where $\beta$=the selected prism angle $N_0$=zero or any positive integer.

2. In a tubular light conduit for transporting light generally longitudinally therethrough and distributing light therealong, wherein the light conduit has a cylindrical wall member of a transparent material and wherein the wall member has an inner cylindrical smooth surface and an outer cylindrical structured surface having an array of isosceles prisms arranged side by side thereon, with faces of adjacent prisms extending longitudinally along the cylindrical wall member and aligned at a same desired prism angle, the improvement which comprises:

optimizing the light transporting performance by the light conduit, by total internal reflection, and the light distributing performance of the light conduit, relative to radially aligned, high incident angle longitudinal light rays in planes parallel or near parallel to the prisms, as a function of the desired prism angle between the faces of adjacent prisms wherein the function for achieving light transporting by total internal reflection comprises:

$N\beta=90$, when $0°<\beta<90°$, $Th=(N_0+\frac{1}{2})W\times\tan(270-2\beta)$, when $90°<\beta<120°$, $\beta=120°$, and $$Th = \frac{(N_0 + 1/2)W}{-\tan\beta},$$

when $120°<\beta180°$.

where $\beta$=the desired prism angle $N$=any positive integer $Th$=the average thickness of the wall member $N_0$=zero or any positive integer $W$=one half the width of each prism.

3. In a tubular light conduit for transporting light generally longitudinally therethrough and distributing light therealong, wherein the light conduit has a cylindrical wall member of a transparent material and wherein the wall member has an inner cylindrical smooth surface and an outer cylindrical structured surface having an array of isosceles prisms arranged side by side thereon, with faces of adjacent prisms extending longitudinally along the cylindrical wall member and aligned at a same desired prism angle, the improvement which comprises:

optimizing the light transporting performance by the light conduit, by total internal reflection, and the light distributing performance or the light conduit, relative to radially aligned, high incident angle longitudinal light rays in planes parallel or near parallel to the prisms, as a function of the desired prism angle between the faces or adjacent prisms wherein the desired prism angle is 120 degrees.

4. In a tubular light conduit for transporting light generally longitudinally therethrough and distributing light therealong wherein the light conduit has a cylindrical wall member or a transparent material and wherein the wall member has an inner cylindrical smooth surface and an outer cylindrical structured surface having an array of prisms arranged side by side thereon, with faces of adjacent prisms extending longitudinally along the cylindrical wall member and aligned at a same desired prism angle, the improvement which comprises:

optimizing the light transporting performance by the light conduit, by total internal reflection, and the light distributing performance of the light conduit, relative to radially aligned, high incident angle longitudinal light rays in planes parallel or near parallel to the prisms, as a function of the desired prism angle between the faces of adjacent prisms wherein the prisms are non-isosceles prisms.

5. A hollow tubular light conduit for transporting light therealong and distributing light therefrom comprises:

a cylindrical wall member of a transparent material, the wall member having an inner smooth surface and an outer structured surface, the structured surface having a linear array of isosceles prisms arranged side by side thereon with faces of adjacent prisms extending longitudinally along the cylindrical wall member and aligned at a selected prism angle of greater than 90 and less than 120 degrees wherein, depending on the selected prism angle, the wall member exhibits light piping via total internal reflection relative to radially aligned, high incident angle longitudinal light rays in planes parallel or near parallel to the prisms when the following condition is satisfied:

$Th = (N_0 + \tfrac{1}{2})W \times \tan(270 - 2\beta)$ where $\beta$ = the selected prism angle Th = the average thickness of the wall member $N_0$ = zero or any positive integer W = one half the width of each prism.

6. A hollow tubular light conduit for transporting light therealong and distributing light therefrom comprises:

a cylindrical wall member of a transparent material, the wall member defined by an inner smooth surface and an outer structured surface, the structured surface having a linear array of prisms arranged side by side thereon, with faces of adjacent prisms extending longitudinally along the cylindrical wall member and aligned at a selected prism angle of 120 degrees, and with each face aligned at 30 degrees relative to the tangent of the opposite smooth surface, wherein the wall member exhibits light piping via total internal reflection relative to radially aligned, high incident angle longitudinal light rays in planes parallel or near parallel to the prisms.

7. A hollow tubular light conduit for transporting light therealong and distributing light therefrom comprises:

a cylindrical wall member of a transparent material, the wall member having an inner smooth surface and an outer structured surface, the structured surface having a linear array of isosceles prisms arranged side by side thereon with faces of adjacent prisms extending longitudinally along the cylindrical wall member and aligned at a selected prism angle of greater than 120 and less than 180 degrees wherein, depending on the selected prism angle, the wall member exhibits light piping via total internal reflection relative to radially aligned, high incident angle longitudinal light rays in planes parallel or near parallel to the prisms when the following condition is satisfied:

$$Th = \frac{(N_0 + 1/2)W}{-\tan\beta},$$

where $\beta$ = the selected prism angle

Th = the average thickness of the wall member $N_0$ = zero or any positive integer W = one half the width of each prism.

8. A hollow tubular light conduit for transporting light therealong and distributing light therefrom comprising:

a cylindrical wall member of a transparent material, the wall member having an average thickness (Th) defined by an inner smooth surface and an outer structured surface, the structured surface having a linear array of isosceles prisms arranged side by side thereon with faces of adjacent prisms extending longitudinally along the cylindrical wall member and aligned at a selected prism angle ($\beta$), each prism having a width (2W), wherein the wall member exhibits light piping via total internal reflection relative to radially aligned, high incident angle longitudinal light rays in planes parallel or near parallel to the prisms based on the prism angle when one of the following conditions is satisfied:

$Th = (N_0 + \tfrac{1}{2})W \times \tan(270 - 2\beta)$, when $90° < \beta < 120°$, or $\beta = 120°$, or $$Th = \frac{(N_0 + 1/2)W}{-\tan\beta},$$

when $120° < \beta < 180°$, where $N_0$ = zero or any positive integer.

* * * * *

UNITED STATES PATENT AND TRADEMARK OFFICE
CERTIFICATE OF CORRECTION

PATENT NO.   : 5,745,632
DATED        : April 28, 1998
INVENTOR(S)  : John F. Dryer Page 1 of 1

It is certified that error appears in the above-identified patent and that said Letters Patent is hereby corrected as shown below:

Title page,
The Serial No. "544,755" should read -- 08/544,775 --.

Column 4,
Line 31, "wail" should read -- Wall --.

Column 7,
Line 44, "$N_o B+B/2=90$" should read -- $N_o B = B/2 = 90$ --.

Signed and Sealed this

Twenty-fifth Day of December, 2001

Attest:

JAMES E. ROGAN
Attesting Officer
Director of the United States Patent and Trademark Office